United States Patent [19]

Medlin

[11] Patent Number: 4,843,598
[45] Date of Patent: Jun. 27, 1989

[54] METHOD OF SHEAR WAVE POROSITY LOGGING OF A SUBSURFACE FORMATION SURROUNDING A CASED WELL

[75] Inventor: W. L. Medlin, Dallas, Tex.

[73] Assignee: Mobil Oil Corporation, New York, N.Y.

[21] Appl. No.: 189,880

[22] Filed: May 3, 1988

[51] Int. Cl.4 .......................... G01V 1/40; G01V 1/28
[52] U.S. Cl. ......................................... 367/27; 67/31; 67/75; 364/422
[58] Field of Search ....................... 367/27, 31, 40, 75; 364/422

[56] References Cited

U.S. PATENT DOCUMENTS

| | | | |
|---|---|---|---|
| Re. 24,446 | 3/1958 | Summers | 181/5 |
| 3,333,238 | 7/1967 | Caldwell | 340/18 |
| 3,362,011 | 1/1968 | Zemanek, Jr. | 340/18 |
| 4,383,308 | 5/1983 | Caldwell | 367/31 |
| 4,432,077 | 2/1984 | Alhilali et al. | 367/31 |
| 4,516,228 | 5/1985 | Zemanek, Jr. | 367/75 |
| 4,575,828 | 3/1986 | Williams | 367/31 |
| 4,649,525 | 3/1987 | Angona et al. | 367/31 |
| 4,649,526 | 3/1987 | Winfow et al. | 367/27 |
| 4,683,557 | 7/1987 | Willis | 367/57 |
| 4,692,910 | 9/1987 | Sondergeld et al. | 367/75 |
| 4,698,792 | 10/1987 | Kurkjian et al. | 367/31 |
| 4,715,019 | 12/1987 | Medlin et al. | 367/31 |
| 4,718,046 | 1/1988 | Medlin | 367/31 |

FOREIGN PATENT DOCUMENTS 284118 9/1986 Australia .

OTHER PUBLICATIONS

Pickett, G. R.; "Acoustic Character Logs . . . Evaluation", 10/10/82, pp. 208–216, 37th Annu. SPE Fall mgt.; Abst.

"Acoustic Character Logs and Their Applications in Formation Evaluation", G. R. Pickett, Journal of Petroleum Technology, Jun. 1963, pp. 659–667.

"Mode Conversion Technique Employed in Shear Wave Velocity Studies of Rock Samples Under Axial & Uniform Compression", Socy. of Petroleum Engineers Journal, pp. 136–148, Author: A. R. Gregory.

"Fluid Saturation Effects on Dynamic Elastic Properties of Sedimentary Rocks", A. R. Gregory, Geophysics, vol. 41, No. 5, 10/76, pp. 895–913.

"Relationships Between Compressional—Wave and Shear—Wave Velocities in Clastic Silicate Rocks", J. P. Castagna, M. L. Batzle and R. L. Eastwood, Geophysics, vol. 50, No. 4, (4/85) pp. 571–581.

"Wave Velocities in Rocks as a Function of Changes in Overburden Pressure and Pore Fluid Saturants", M. S. King, Geophysics, vol. XXXI, No. 1, (2/66), pp. 50–73.

"Effects of Porosity and Clay Content on Wave Velocities in Sandstones", De—hua Han, A. Nur and Dale Morgan, Geophysics, vol. 51, #11, 11/86, pp. 2093–2107.

U.S. patent appln. S.N. 192,446, filed 5/11/88, W. L. Medlin, Mobil Docket No. 4819, incorporated herewith.

Primary Examiner—Nelson Moskowitz
Attorney, Agent, or Firm—Alexander J. McKillop; Charles J. Speciale; George W. Hager, Jr.

[57] ABSTRACT

The porosity of a formation surrounding a cased well is determined from a shear wave log of the formation. Shear wave velocity is derived from the log and formation porosity is identified from a predetermined correlation between core-derived porosity for the type of formation traversed by the cased well and shear wave velocity.

3 Claims, 4 Drawing Sheets

METHOD OF SHEAR WAVE POROSITY LOGGING OF A SUBSURFACE FORMATION SURROUNDING A CASED WELL

BACKGROUND OF THE INVENTION

In the production of minerals, e.g., oil and gas, certain lithological properties of a subterrannean reservoir must be determined. One of the most important of these porperties is the porosity of the reservoir. Porosity of a material is the ratio of the aggregate volume of its void or pore spaces (i.e., pore volume) to its gross bulk volume and, in the case of an oil or gas reservoir, is a measure of the capacity within the reservoir rock which is available for storing oil or gas. Normally, porosity is determined by taking core samples from the reservoir and carrying out well-defined measurement techniques on the samples. In practice, cores are obtained in very few wells because of the expense of coring and analysis and because of the long delay in obtaining results.

Consequently, there is a crucial need for a simple logging method which provides early porosity measurements in intervals of interest. A logging method which can be used in cased wells has added value. It provides a way to detect by-passed pay intervals and to estimate reserves in older wells where porosity data are unavailable. It is this need for porosity measurements by logging methods to which the present invention is directed.

SUMMARY OF THE INVENTION

In accordance with the present invention there is provided a method for shear wave porosity logging of a formation traversed by a cased well. Asymmetric acoustic energy is generated within a cased well. Acoustic energy that has traveled through the formation surrounding the cased well following generation of such asymmetric acoustic energy is received within the cased well. The velocity of acoustic energy travel through the formation surrounding the cased well in the form of shear waves created by displacement of the cased well under the influence of pressure waves from the generated asymmetric acoustic energy is determined. The porosity of the formation surrounding the cased well and through which the acoustic shear waves have traveled is then determined in accordance with a predetermined correlation between formation porosity and shear wave velocity through the formation.

In a further aspect, the predetermined correlation is between log-derived values of the reciprocal of shear wave velocity and core-derived porosity for the type of formation traversed by the cased well. The cored-derived porosity is representative of a formation in which clay content does not distort the porosity determination. The predetermined correlation is also a time-average relationship between shear wave velocity and porosity.

In a still further aspect the cased well includes well pipe with cement bonding to the formation. Th generated asymmetric acoustic energy produces displacement in both the well pipe and the cement. This displacement produces acoustic shear wave energy in the formation surrounding the cased well. Shear wave velocity is determined from about the first few cycles of vibration of the received acoustic shear wave energy that has traveled through the formation in a travel time of less than about 210 microseconds per foot. Filtering removes acoustic compressional wave energy that may have traveled through the cased well due to any defect in the cement bonding of the well pipe to the formation.

DESCRIPTION OF THE PREFERRED EMBODIMENT

The present invention is directed to a new method of acoustic logging which uses shear waves in the determination of formation porosity behind well casing. The method employs a direct generation of shear waves and utilizes an empirical correlation between shear wave travel time and porosity.

Figure 1:
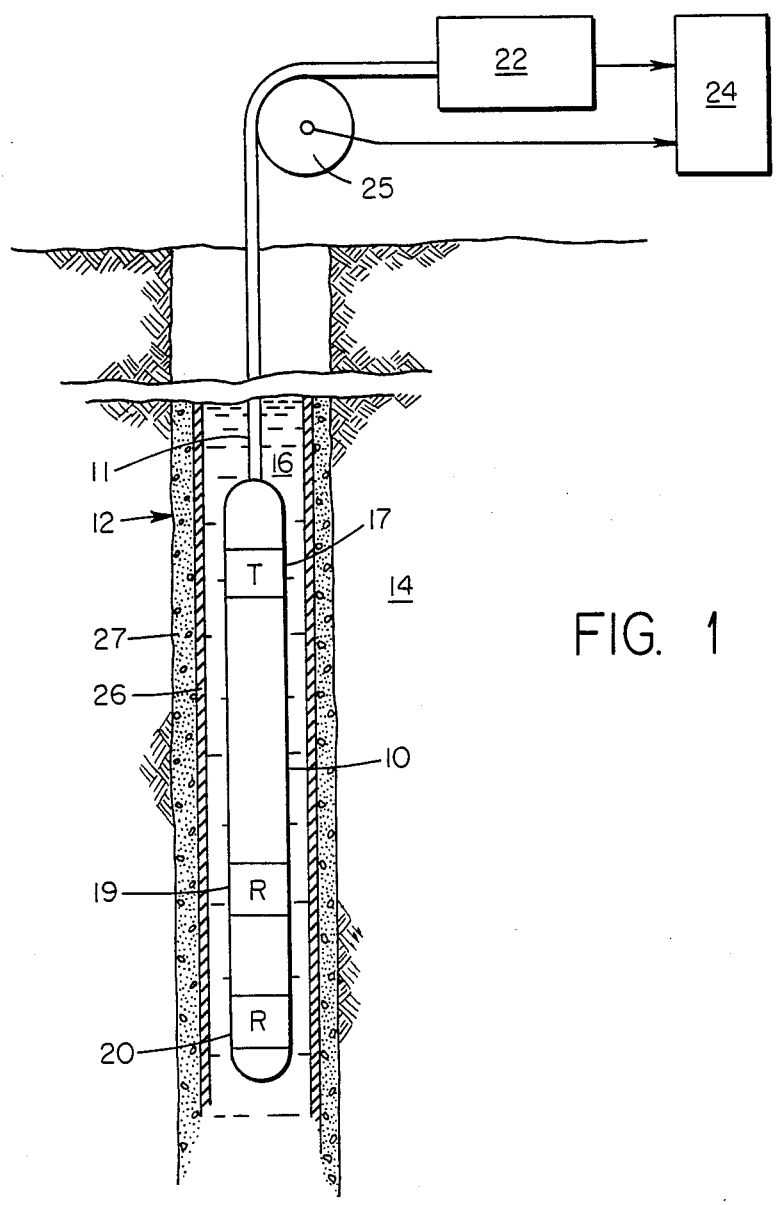
FIG. 1 illustrates an acoustic well logging system employed in carrying out the shear wave porosity logging method of the present invention.

Referring now to FIG. 1, there is illustrated an acoustic logging system that produces shear motion directly in a subsurface reservoir without depending on mode conversion of compressional waves. The logging system includes an elongated logging tool 10 which is suspended from a cable 11 within a cased well 12 which traverses a subsurface reservoir of interest 14. Reservoir 14 may be a suspected oil or gas bearing formation which is to be characterized in regard to its porosity. The well 12 is filled with a liquid such as drilling mud 16. The logging tool 10 comprises an acoustic transmitter 17 and acoustic receivers 19 and 20. Signals from the logging tool 10 are transmitted uphole by conductors within cable 11 to any suitable utilization system at the surface. For example, the utilization system is illustrated as comprising an uphole analysis and control circuit 22 and recorder 24 in order that the output from circuit 22 may be correlated with depth.

Transmitter 17 and preferably also receivers 19 and 20 are asymmetric acoustic wave generators of the type that produce shear waves in the formation surrounding the well. A shear wave is a wave in which the motion, or direction of displacement, of the particles of the medium in which the wave travels, is perpendicular to the direction of propagation of the wave. Such a shear wave is directly generated in the formation when the pressure wave within the well fluid 16, created by the transmitter 17, strikes the cased well 12. The casing of well 12 includes well pipe 26 bonded to the formation 14 with cement 27. Such shear wave generation does not, therefore, depend on mode conversion of compressional waves. Transmitter 17 is an asymmetric acoustic energy source such as, for example, the bender-type transducer described in U.S. Pat. Nos. 4,516,228 to Zemanek, Jr. and 4,649,525 to Angona and Zemanek, Jr., the teachings of which are incorporated herein by reference. While such bender-type transducer is described in such patents as being a pair of piezoelectric plates bonded together for dipole flexural motion, the transducer may suitably be a single piezoelectric element. Further, the single piezoelectric element or the pair of piezoelectric plates may be mounted, respectively, on a single or opposite side of an inert element which is properly hinged for the flexural motion. Other suitable transducers that may be successfully employed may be of the conventional magnetostrictive or electro-magnetic type.

Preferably shear wave velocity is determined from the travel time of the acoustic shear wave energy between the pair of spaced apart receivers 19 and 20. However, such velocity can alternatively be determined from the travel time between the transmitter 17 and a single receiver should only one receiver be employed.

Shear wave porosity logging is similar in concept to conventional acoustic porosity logging but uses shear waves instead of higher frequency compressional waves. Shear wave velocity is more sensitive to porosity, less sensitive to hole conditions, and insensitive to gas saturation. More importantly, cemented casing is transparent to early shear wave arrivals, so hsigh quality velocity data can be obtained through the casing. In cased wells the shear wave transmitter 17 produces ample shear energy in the formation through displacement of the pipe and cement. However, the casing deflection does not produce any detectable shear wave propagation in the pipe itself because of its small wall thickness and because of frequency effects. Similarly, the transmitter 17 does not generate significant compressional wave energy in either the pipe or the formation as long as the cement bond is good.

Under these conditions, the earliest acoustic wave arrivals at the receivers 19 and 20 are formation shear waves and pipe tube waves. The tube waves are asymmemtric, but they have approximately the same travel time as symmetric tube waves, 210-230 $\mu$sec/ft in conventional oil field pipe. In formations where the shear wave travel time is less than 210 $\mu$sec/ft, the earliest arrival is the formation shear wave.

Figure 2:
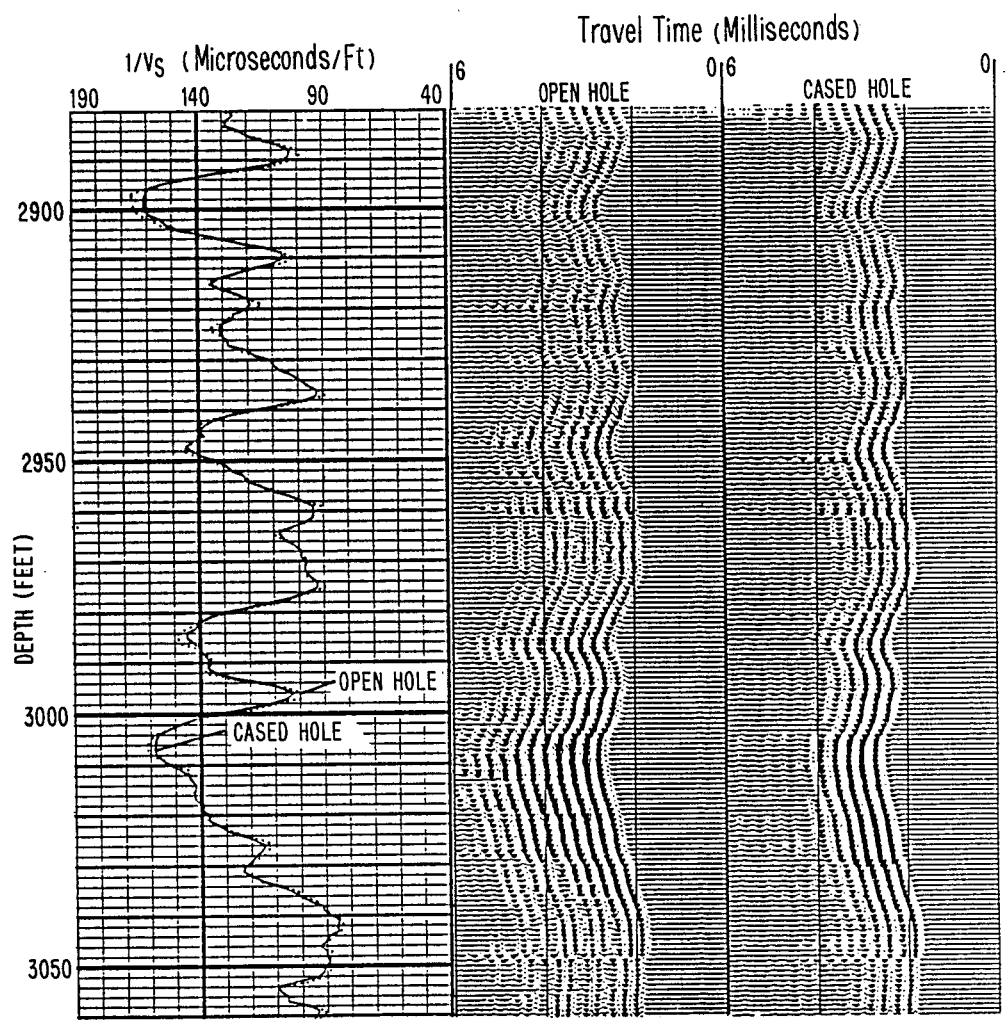
FIG. 2 illustrates a shear wave log obtained in an open well in comparison with a shear wave log obtained through the same formation interval in a cased well.

This is shown in FIG. 2 which compares an open hole shear wave log with a shear wave log obtained through the same interval in a cased well. The early formation shear arrivals in the open hole log are faithfully reproduced in the cased hole log through the first 5-6 cycles of vibration. Beyond that, the pipe tube waves appear in the cased hole log, and the shear wave vibrations are obscured. In this case the casing is effectively transparent to the early-arriving, formation shear waves. Travel times computed by first arrival techniques give excellent agreement between the open and cased hole logs.

In intervals with poor cement bond, the shear wave logging tool generates large amplitude compressional waves in the casing. However, they are much higher in frequency than the formation shear waves and can be eliminated by filtering.

Cement bond quality has little influence on the amplitude of formation shear waves generated by the shear wave logging tool. Generation of formation shear waves seems to require only a rigid filling between pipe and formation, not a good cement bond. This makes the shear wave porosity logging method of the present invention attractive for evaluating old wells where porosity logs were inferior or never run.

Consequently, shear wave velocity logs can be obtained through casing provided the velocity is large enough. The cutoff, 210 $\mu$sec/ft, is about the same as the one for shear wave logging through mode conversion and refraction.

An example would be a formation with a fast chalk interval overlying a slow shale before and after casing. Shear wave travel times in the chalk interval may be 170-195 $\mu$sec/ft. Therefore the first shear arrivals are well ahead of the first casing tube wave arrival with a 210 $\mu$sec/ft travel time. In the overlying shale the shear wave travel time increases well above 210 $\mu$sec/ft. Thus, formation shear arrivals in the cased hole log fall well behind the casing arrivals and cannot be detected. In this example cased hole shear wave logging can be used in the fast chalk formation but not in the slow shale formation.

To use shear waves for porosity determination, there must be a correlation between porosity and shear wave velocity for the particular type of formation being logged. The existance of such correlations has long been recognized in ultrasonic laboratory data reported in the literature. Numerous laboratory studies have been made of the correlations between both compressional and shear wave velocities and porosity in ultrasonic measurements on core and quarry of samples of sandstones and carbonates. Several of such studies are found in G.R. Pickett, "Acoustic Character Logs and Their Applications in Formation Evaluation," Jour. Pet. Tech., pp. 659-667 (June 1963); A. R. Gregory, "Fluid Saturation Effects on Dynamic Elastic Properties of Rocks," Trans. AIME, Vol. 240, p. 136 (1967); A. R. Gregory, "Mode Conversion Technique Employed in Shear Wave Velocity Studies of Rock Samples Under Axial and Uniform Compression", Soc. of Pat. Eng. Journal, June, 1967, pp. 136-148; M. S. King, "Wave Velocities in Rocks as a Function of Changes in Overburden Pressure and Pore Fluid Saturants," Geophys. Vol. 31, pp. 50-73 (1966); and J. P. Castagna, "Relationships Between Compressional-Wave and Shear-Wave Velocities in Elastic Silicate Rocks", Geophysics, Vol. 50, No. 4 (April 1985), pp. 571-581. All of these studies have led to the conclusion that shear wave velocity correlates with porosity as well as, or better than, compressional wave velocity. Further, shear wave velocity is more sensitive to porosity and is insensitive to gas saturation.

An important contributio has been repored by D. Han, A. Nur, and D. Morgan, "Effects of Porosity and Clay Content on Wave Velocities in Sandstones," Geophys., Vol. 51, pp. 2093-2107 (1986). These authors compiled compressional and shear wave ultrasonic data for a large variety of sandstones with varying clay content. They showed that velocity-porosity correlations are sensitive to the clay concentration and proposed an additional term in the time-average relation to account for it. When the clay effect is accounted for, the scatter in the correlations is greatly reduced for both compressional and shear wave data.

In the shear wave porosity logging method of the present invention, shear wave velocity data are converted to porosity logs through empirical correlations developed from core data.

To develop the log-derived porosity correlation for sandstones, for example, shear wave log data was obtained in 11 select wells containing more than 4000 ft of cored interval at depths between 2400 and 11,500 feet.

In compiling log and core analysis data for the select wells, the following restrictions were established. Sandstone intervals are of no less than 4 ft nor more than 20 ft thickness. The 4 ft lower limit is consistent with the 3-4 ft vertical resolution of the logging tool. Intervals in which the porosity or shear wave travel time was widely varying were eliminated. Over such selected interval, an averae porosity and shear wave travel time were determined to provide a single data point. The resulting correlation between porosity and shear wave travel time has the form of a time-average relation as seen in FIG. 3.

Figure 3:
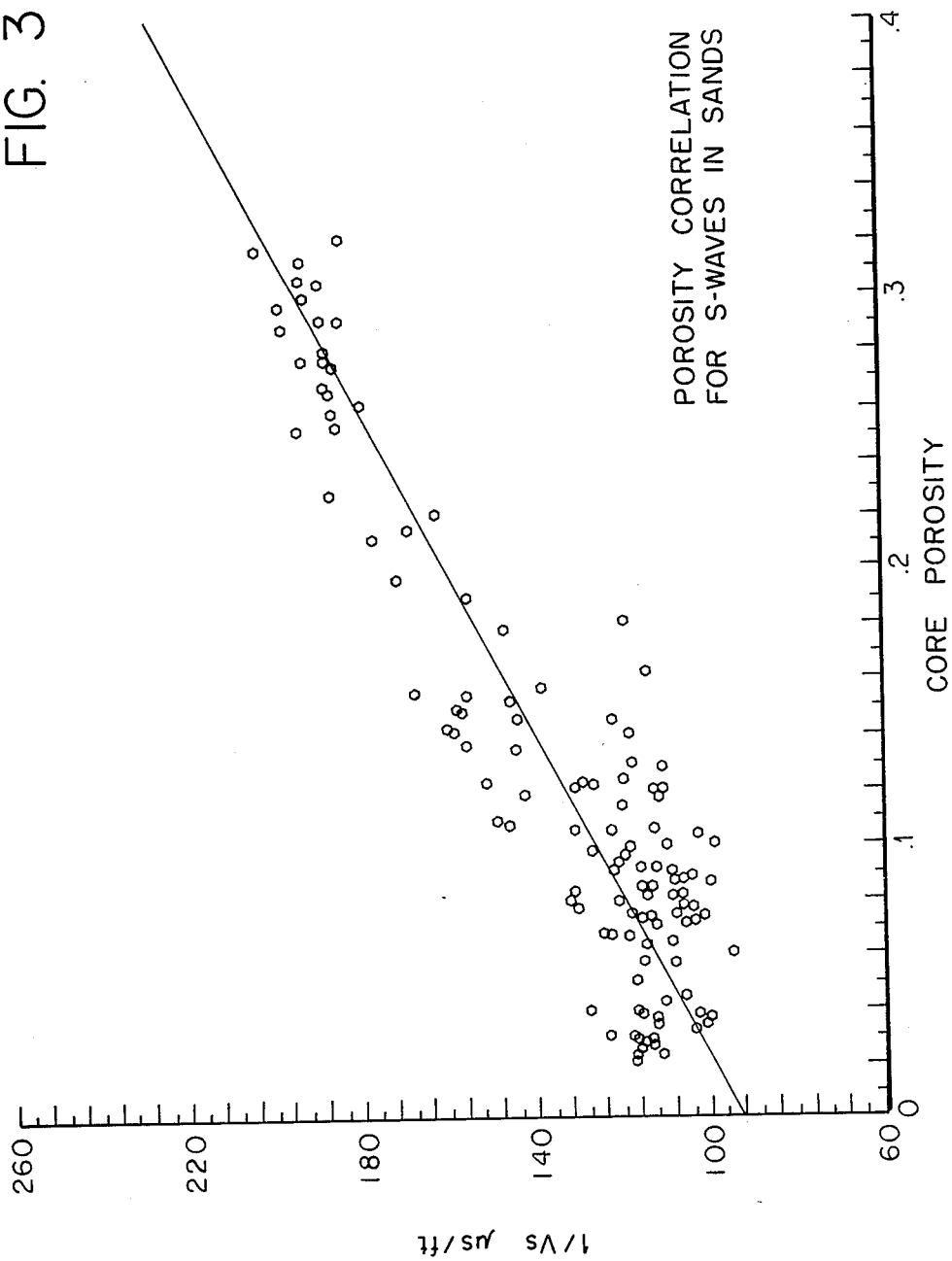
FIG. 3 is a graphical plot of the correlation between shear wave travel time and formation porosity derived from formation core samples in clay-poor sand.

All of the data collected in thi way are plotted in FIG. 3 as reciprocal shear velocity $1/V_s$ (travel time) versus core-derived porosity. These data represent only clay-poor sands. Clay-rich sands represent a different class of behavior.

It can be seen that the clay-poor data points fall on a straight line consistent with a "time-average" relation. The straight line in FIG. 3 is a least squares fit to the clay-poor data points. In this sense, the log-derived data are consistent with the ultrasonic results reported by Han et al.

Different lithologies provide a family of lines whose slopes and intercepts are determined by the physical properties of matrix grains and the cement bonding between grains. Accordingly the intercept is characteristic of the cement bonding as well as the formation matrix. The "time averaeg" relation corresponding to the straight line is given by:

$$1/V_s = A + B\phi, \quad (1)$$

where $V_s$ is shear wave velocity, $\phi$ is porosity, A is intercept and B is slope.

The "time-average" relation corresponding to the straight line of FIG. 3 for clay-poor sand is given by:

$$1/V_s = 92.4 + 366 \phi. \quad (2)$$

Such equation (1) provides the correlation needed for porosity logging in clay-poor sands through casing with the shear wave logging tool. Equation (1) is used to compute $\phi$ directly from the shear wave travel time, $1/V_s$.

This means that some method is required to classify a sand of interest as clay-poor or clay-rich. In areas where wells have been cored in the past, this problem can be solved by running the shear wave log in the cased well. Core porosity data can then be used to determine which category the sand falls in.

In most cases this problem is academic. Usually clay-rich sands will have travel times greater than the 210 $\mu$sec/ft cutoff for casing tube waves. Therefore, cases hole shear wave logging cannot be applied because the formation shear arrivals fall behind the casing tube wave arrivals.

Figure 4:
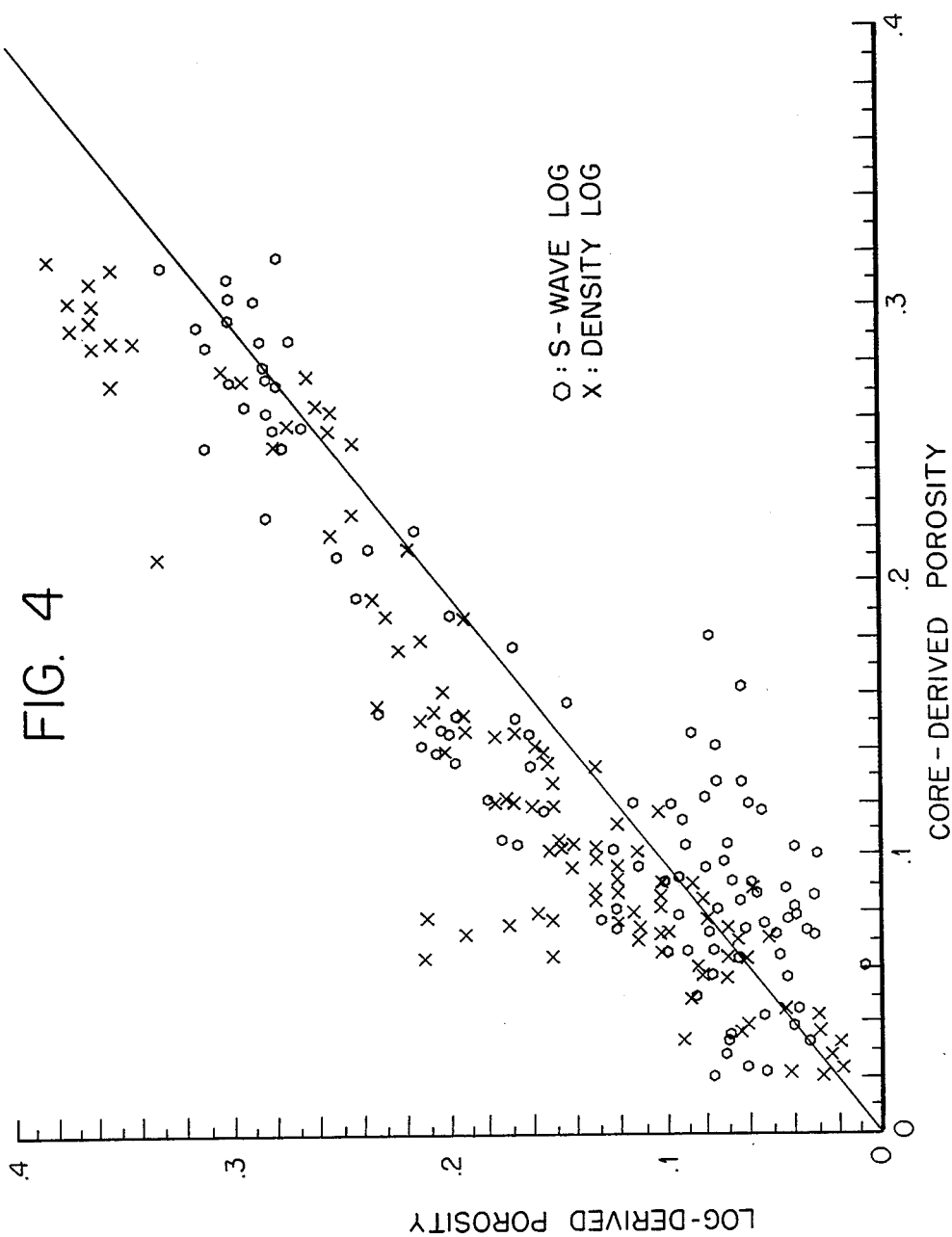
FIG. 4 is a comparison of shear wave logging derived porosity data and porosity obtained from standard density logs.

The scatter of data points about the correlation line of FIG. 3 gives some idea of the relialbility of the shear wave logging method of the present invention for porosity logging through casing. A better perspective is provided by comparing the shear-derived porosity data with porosities obtained from standard density logs. Such a comparison is shown in FIG. 4. Here we have plotted shear-derived porosity versus core porosity as open circles. These data were computed from Equation (1). The x's show density log porosities obtained from commercial density logs run in each of the 11 wells. The comparison shows that the shear wave porosity log has about the same degree of reliability as commercial density logs.

What is claimed is:

1. A method for porosity logging of a formation surrounding a cased well, comprising the steps of:
   (a) generating asymmetric acoustic energy within a cased well,
   (b) receiving acoustic energy after it has traveled through the formation surrounding said cased well,
   (c) determined from said received acoustic energy the velocity of acoustic shear wave energy through said formation, and
   (d) determining the porosity of said formation in accordance with a predetermined correlation between log-derived values of the reciprocal of acoustic shear wave velocity and core-derived porosity for the type of formation traversed by said cased well.

2. The method of claim 1 wherein said core-derived porosity is representative of a formation in which clay content does not distort the porosity determination.

3. The method of claim 1 wherein said predetermined correlation is a time-average relationship between shear wave velocity $V_s$ and porosity $\phi$ represented by the following expression:

$$1/V_s = A + B\phi,$$

where A is intercept and B is slope determined by the physical properties of the formation matrix grains and the cement bonding between grains.

* * * * *